United States Patent
Okanoue et al.

[11] Patent Number: 5,968,130
[45] Date of Patent: Oct. 19, 1999

[54] BRIDGE UNIT, FRAME TRANSFER METHOD OF THE BRIDGE UNIT AND COMPUTER PROGRAM FOR FRAME TRANSFER

[75] Inventors: Kazuhiro Okanoue; Tomoki Osawa, both of Tokyo, Japan

[73] Assignee: NEC Corporation, Tokyo, Japan

[21] Appl. No.: 08/800,125

[22] Filed: Feb. 13, 1997

[30] Foreign Application Priority Data

Feb. 15, 1996 [JP] Japan ................................. 8-027713

[51] Int. Cl.[6] ............................. G06F 13/00; G06F 15/00
[52] U.S. Cl. ........................ 709/238; 709/221; 709/224; 709/227; 709/242; 370/216; 370/248; 370/254; 370/431; 340/286.02; 340/825.52; 340/825.07; 340/711
[58] Field of Search ........................... 370/60, 61, 85.13, 370/58.1, 94.1, 60.01; 395/525; 340/827, 26; 455/56, 57, 52–54; 379/59; 709/201, 202, 203, 204, 207, 217, 218, 220, 230, 238, 239, 241, 243

[56] References Cited

U.S. PATENT DOCUMENTS

| | | | |
|---|---|---|---|
| 4,876,738 | 10/1989 | Selby | 455/33 |
| 5,060,228 | 10/1991 | Tsutsui et al. | 370/85.13 |
| 5,570,466 | 10/1996 | Oechsle | 395/200.15 |

*Primary Examiner*—Frank J. Asta
*Assistant Examiner*—Beatriz Prieto
*Attorney, Agent, or Firm*—Sughrue, Mion, Zinn, Macpeak & Seas, PLLC

[57] ABSTRACT

A location information management table 14 stores information on the location of the host both at present and prior to the movement. The host is movable based on the transmission address contained in the frame transmitted therefrom. The frame addressed to the host is transferred to the segment presently connected and to the segment that has been previously connected based on the table 14. Even though the host locates halfway among a plurality of segments, stable communication can be realized. When the host moves away from other segment toward the center of one segment, the frame is transferred to one segment at a time when the timer terminates its counting operation, thus deleting unnecessary traffic.

14 Claims, 4 Drawing Sheets

BRIDGE UNIT, FRAME TRANSFER METHOD OF THE BRIDGE UNIT AND COMPUTER PROGRAM FOR FRAME TRANSFER

BACKGROUND OF THE INVENTION

The present invention relates to a bridge unit that connects a plurality of segments as components of a network and, more particularly, of the bridge unit designed to support a movable host moving between the aforementioned segments.

The bridge unit connecting one segment to another monitors a source address (hereinafter referred to as SA) of a frame flowing on the respective segments so that a host connected to those segments is recognized. The bridge unit realizes efficient frame transfer based on the above-obtained host location information.

Supposing that each segment of the network is constructed using a broadcast medium such as "Ethernet" proposed by Xerox (U.S.A.), rules of the frame transfer are specified as follows.

1: If a destination address (hereinafter referred to as DA) of a received frame is a broadcast address, the broadcast is executed to all segments except the reception segment that the received frame has been transmitted.

2: If a segment connecting the host defined by the DA of the received frame is identified and the identified segment does not coincide with the segment that the received frame has been transmitted, the received frame is transferred to the segment connecting the identified host.

3: If a segment connecting the host defined by the DA of the received frame is identified and the identified segment coincides with the segment that the received frame has been transmitted, the identified segment is able to receive the received frame at all nodes, thus abandoning the received frame that is not required to be transferred.

4: If a segment connecting the host defined by the DA of the received frame is not identified, the received frame is transferred to all segments except the segment that the received frame has been transmitted.

When the host transmits the frame while moving between segments, the bridge unit misjudges that the host is connected to a plurality of segments, resulting in misleading host location information. In order to solve the aforementioned problem, a bridge unit that detects a host movement by monitoring a frame flowing on the segment so as to immediately update the host location information is disclosed in JP-A-217141/1992 or JP-A-154335/1992.

In case of a plurality of segments each formed of a radio medium, the host may locate halfway between those segments. In such a case, the conventional art can no longer overcome the above-described problem.

As it is known that the radio transmission path varies with time, the frame transmitted from a certain segment cannot always be received. In order to realize stable communication, it is desirable to receive the respective signals on a plurality of segments simultaneously. Transmitting the frame on a plurality of segments simultaneously may stabilize the communication. However unnecessary traffic may be generated compared with transmission of the frame only to a single segment.

SUMMARY OF THE INVENTION

The objective of the present invention is to solve the aforementioned problem.

The further objective of the present invention is to provide a bridge unit allowing for stable communication even though a movable host locates halfway between segments as well as adaptively controlling to reduce the unnecessary traffic.

The object of the present invention is achieved by a bridge unit comprising: frame reception means for receiving a frame transmitted from a host connected to one of a plurality of segments on a network;

a location information management table for managing information indicating as to which segment a host is connected;

host connection segment judgment means for judging whether or not a host having a source address contained in a frame received by said frame reception means is connected to a segment other than a segment that said frame has been transmitted by referring said location information management table;

host movement judgment means for determining that said host has moved between segments when said host connection segment judgment means judges that said host is connected to a segment other than a segment that said frame has been transmitted;

host register means for registering information indicating that said host is connected to a segment other than a segment that said frame has been transmitted for said location information management table for a predetermined period and then abandoning said registration information and also registering information that said host is connected to said segment that said frame has been transmitted for said location information management table when said host movement judgment means determines that said host has moved between segments; and frame transfer means for detecting a host from said location information management table based on said destination address of a received frame and for transferring said received frame to a segment that has been registered as connecting said detected host having said destination address.

In the present invention, the frame reception means receives the frame and the host connection segment judgment means judges whether or not the host is connected to the segment other than that has received the frame. Then if the host is judged to be connected to the segment other than that has received the frame, it is determined that the host has moved between the segments and the information indicating that the host is connected to other segment is abandoned after being preserved for a predetermined period. When the transfer existence judgment means determines to transfer the received frame, the segment registered for the location information management table as being corresponded to the host is selected. Then the received frame is temporarily transferred to those segments that are expected to have the host therein so as to have stable communication even though the host locates halfway between the segments.

As the information indicating that the host is connected to other segment is preserved for a predetermined time, the received frame does not have to be transferred to a plurality of segments upon expiration of the predetermined time, thus adaptively controlling deletion of the unnecessary traffic.

The present invention can be so constructed in the following manner by preparing a timer.

The host that has transmitted the frame is correlated with the segment used for transmission. Such correlation is sent to the location information management table for registering. A host judgment means is so constructed to identify the host that has transmitted the frame. When the identified host is not registered for the location information management table, the identified host is registered correlating to the segment that has received the frame. A first $T_1$ timer starts counting with respect to the segment correlating with the host. When the identified host is registered for the location information management table, it is judged whether or not the identified segment coincides with the segment that the received frame has been transmitted. In case of no coincidence, a first $T_1$ timer of other segment to which the host has moved is actuated for counting. In the segment having the first $T_1$ timer operating, a second $T_2$ timer is actuated for counting. For a second segment, the second $T_2$ timer is actuated for counting. When the second $T_2$ timer becomes up, the segment corresponding to the host is deleted from the location information management table.

Therefore after deleting the segment from the location information management table upon expiration of the $T_2$ timer, the received frame is no longer transferred to the segment, thus adaptively controlling deletion of the unnecessary traffic.

The above invention comprises, for example, CPU (Central Processing Unit), a storage medium storing the computer program for executing the above-described processing, an operating memory such as RAM (Random Access Memory) or the like, input/output circuits for segments and several timers for measuring time by counting the clock.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention is described in detail with respect to the following embodiments.

Figure 1:
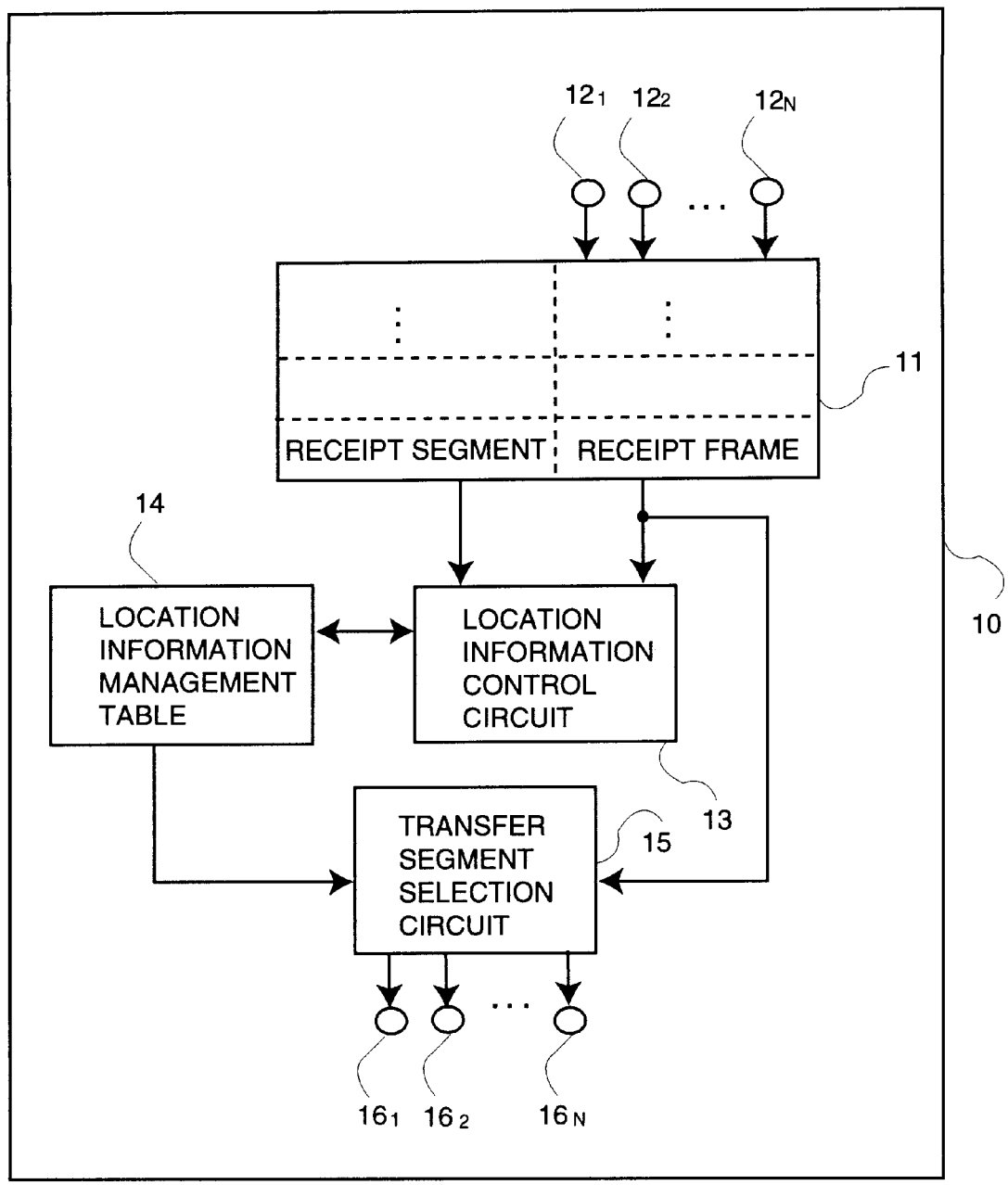
FIG. 1 is a block diagram showing a construction of a bridge unit of an embodiment of the present invention.

FIG. 1 shows a construction of a bridge unit of an embodiment of the present invention. A bridge unit 10 is provided with a reception memory 11. The reception memory 11 comprises first to Nth input terminals $12_1$ to $12_N$ for receiving frames from first to Nth segments (not shown), respectively so as to store information as to which segment has received the frame. A location information control circuit 13 receives information on a frame received from the reception memory 11 and the segment, detects and updates a location information management table 14. A transfer segment selection circuit 15 is connected to first to Nth output terminals $16_1$ to $16_N$, by which a frame is transferred to the segment corresponding thereto, respectively. The above bridge unit 10 comprises, for example, CPU (Central Processing Unit; not shown), a storage medium storing the program, an operating memory such as RAM (Random Access Memory) or the like, input/output circuits for the segments and several timers for measuring time by counting the clock.

Figures 2, 3:
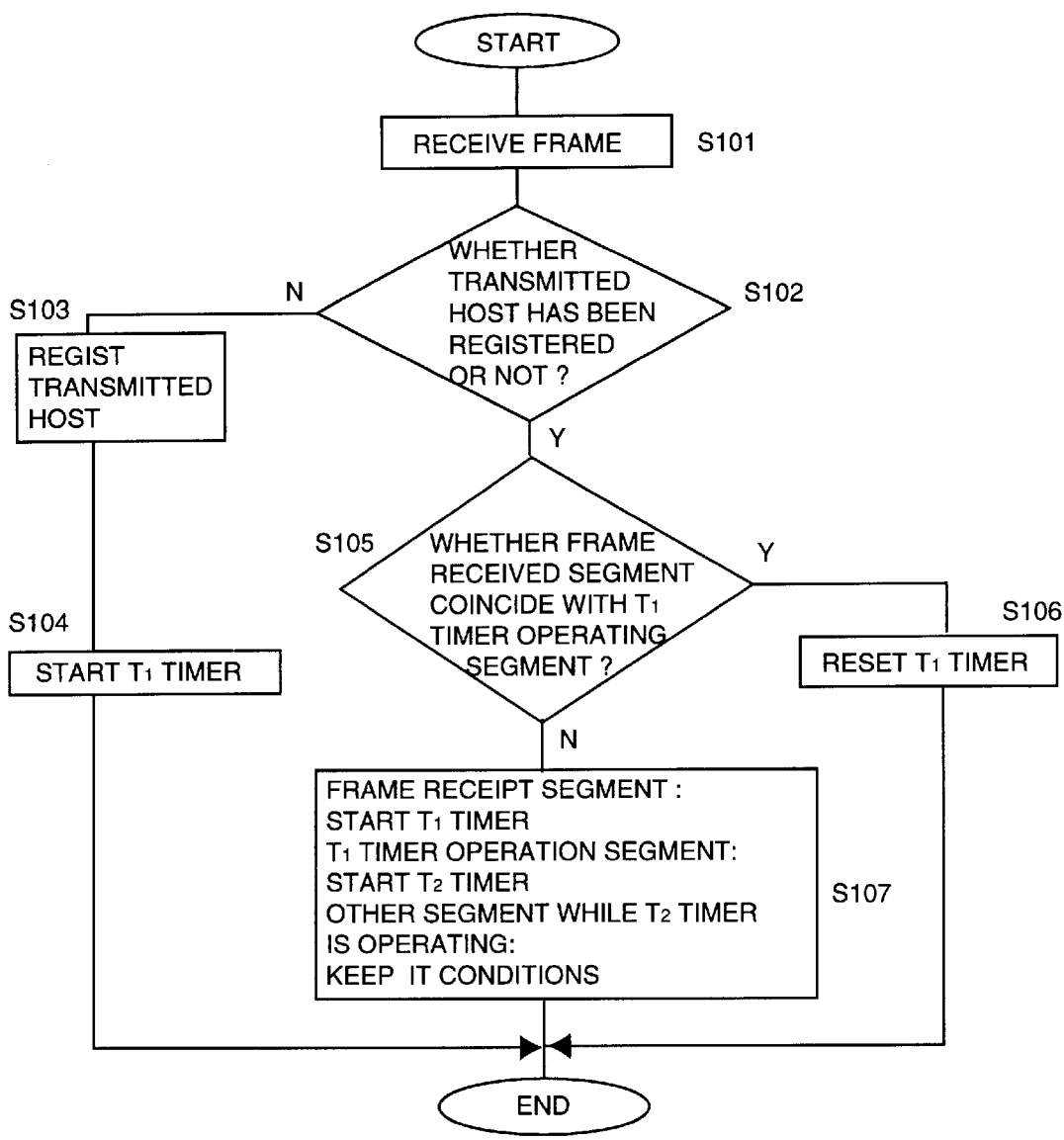
FIG. 2 is a flowchart showing an operation of a location information control circuit when a frame transmitted by a host A is received by the bridge unit of the present invention through a segment A.
FIG. 3 shows an example of a location information management table of an embodiment in detail.

FIG. 2 shows a flow of the operation of the location information control circuit 13 when a frame transmitted by a host A is received by the bridge unit 10 through a segment A. When the bridge unit 10 receives the frame, a host that has transmitted the frame is detected based on the SA contained in the frame (Step S101). It is assumed that a host A is detected. A location information control circuit 13 judges whether or not the host A has been registered for the location information management table 14 (Step S102). If it is judged that the host A is not registered (N), the host A is determined to exist in a segment (segment A) that has received the frame. Then the host A is registered for the location information management table 14 (Step S103). Responding to an entry indicating the existence of the host A in the segment A, a $T_1$ timer is actuated for counting (Step S104).

If it is determined that the host A has been already registered by detecting the location information management table 14 (Step S102; Y), it is judged whether or not the segment that the host A has been transmitted coincides with the segment having the $T_1$ timer operating and the host A has been connected (Step S105). In case of coincidence (Y), i.e., the $T_1$ timer has been actuated upon the entry indicating the existence of the host A in the segment A, the $T_1$ timer is reset (Step S106). The $T_1$ timer is designed to count the time obtained by adding a predetermined time α to a maximum value of the interruption time that is expected to occur with respect to each host.

In the location information management table 14, if there is an entry indicating that the host A has been registered in the segment other than the segment A, for example, segment B and the $T_1$ timer has been actuated accompanied with the above-indicated entry, the $T_1$ timer is stopped upon the entry indicating existence of the host A in the segment B and a $T_2$ timer is actuated. The $T_2$ timer is a timer circuit for compensating instability of the segment, which is used to secure stable communication when receiving a frame from the bilaterally movable radio segments. In this embodiment, the $T_1$ timer is set to, for example, 10 to 20 minutes and the $T_2$ timer is set to, for example, a few minutes.

When the timer $T_2$ is actuated, an entry indicating existence of the host A in the segment A is registered. Upon this entry, the $T_1$ timer is actuated. When the $T_2$ timer has been actuated upon the entry indicating existence of the host A in the segment A, the $T_2$ timer stops counting (Step S107).

The aforementioned control allows the $T_1$ timer to be actuated to the latest segment connecting a certain host in the location information management table 14. Then the $T_2$ timer is actuated to the segment to which the host has been connected before. The location information control circuit 13 deletes all entries to the host in which the $T_1$ timer has been up in the location information management table 14 in spite of existence of the segment having the $T_2$ timer operating. Therefore when the frame corresponding to the host is received, the host is registered again (Step S103).

FIG. 3 shows a detailed example of the location information management table 14. The location information management table 14 of the present embodiment is provided for the bridge unit 10 in order to connect three segments A, B and C. In FIG. 3, as for the host A, the $T_1$ timer is operated only to the segment A. The $T_1$ timer is set to 10 minutes. As for the host B, the $T_1$ timer is operated to the segment B. The $T_2$ timer is operated to the segment C. The $T_1$ and $T_2$ timers are set to 15 minutes and 10 seconds, respectively.

The location information management table 14 presents the following facts. The frame from the host A is continuously received by the segment A. The frame from the host B has been received by the segment C before. At present, however, the frame is received by the segment B. That is the host B has moved from the segment C to the segment B. Therefore the latest segment to which the host B is connected is the segment B. The segment C is the connection segment that is one segment previous to the segment B.

Figure 4:
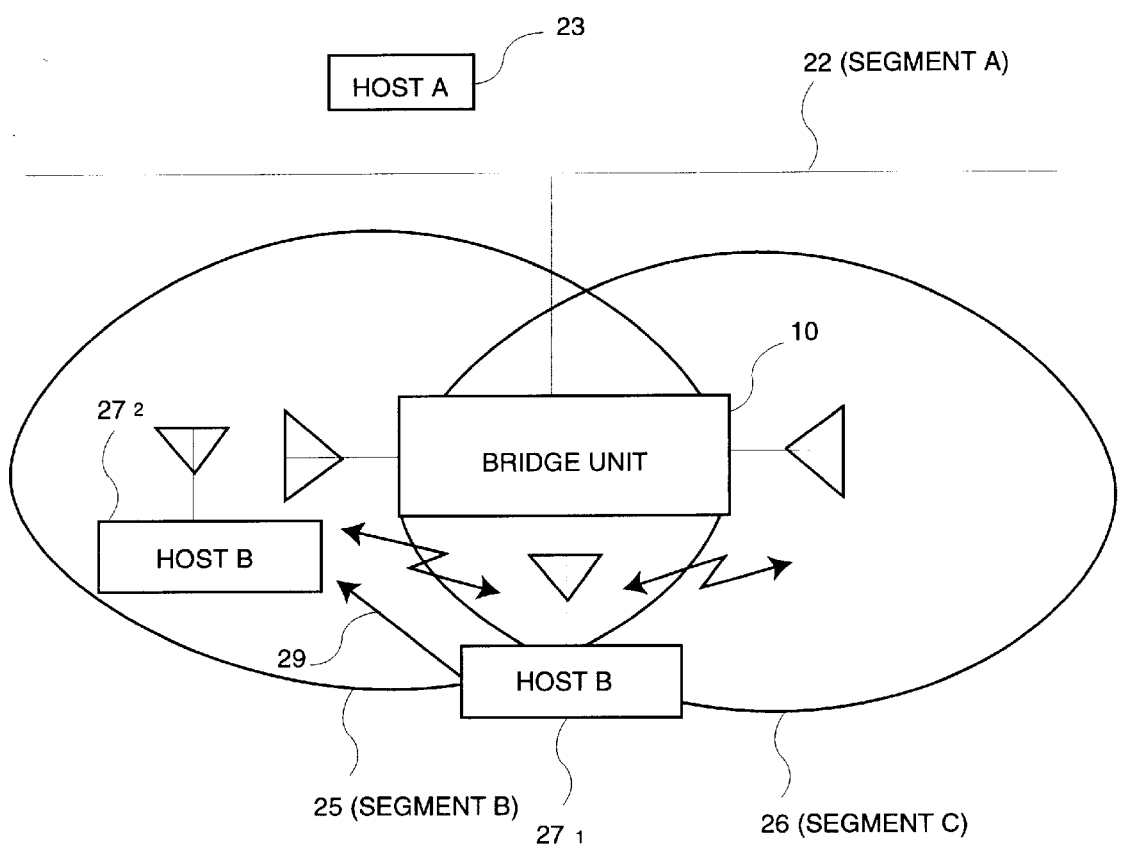
FIG. 4 shows a network structure of an example of a segment structure corresponding to the table content shown in FIG. 3.

FIG. 4 is an example of the construction of the segment corresponding to the table content shown in FIG. 3. In FIG. 4, the bridge unit 10 is connected to a fixed host 23 via a segment 22 formed of a wire segment and connected to a movable host 27 via two segments 25 and 26 formed of radio segment. It is assumed that the segment 22 is designated as the segment A and the segments 25 and 26 are designated as the segments B and C, respectively. The host 23 is designated as the host A and the host 27 is the host B. FIG. 4 shows two hosts (host $27_1$, $27_2$). This represents that the host B has moved in the vicinity of the boundary between the segment B and the segment C in the direction shown by an arrow 29. The host $27_1$ indicates the host B before moving. The host $27_2$ indicates the host B after moving.

In the segment construction shown in FIG. 4, the bridge unit 10 always receives the frame transmitted by the host A through the segment A. The host B is connected to a radio segment. Therefore upon change in the radio propagation environment, the frame transmitted from the host B may be received through the segment B or the segment C. Immediately after receiving the frame from the host B, owing to invertivility of electric wave, the bridge unit 10 is able to determine that the segment (either B or C) that has received the frame from the host B has better propagation environment. Generally, however, it is impossible for the bridge unit 10 to recognize the propagation environment of the radio wave surrounding the host B.

The transfer segment selection circuit 15 shown in FIG. 1 inputs a received frame and then detects its destination host based on DA of the received frame. The transfer segment selection circuit 15 further detects the location information management table 14 (FIG. 3) using the location information control circuit 13 so that the frame is transmitted to all segments having either $T_1$ timer or $T_2$ timer operating with respect to the detected destination host.

FIG. 3 shows that the frame from the host 23 is transmitted to both the segment B and the segment C. Therefore even if the host locates at a boundary between the radio segments B and C like the host B shown as $27_1$, stable communication can be realized. When the host has moved to the area covered only by the segment B like the host B shown as $27_2$, the bridge unit 10 stops receiving the frame from the other segment C. At this time, the location information control circuit 13 drives the segment B corresponding to the host B after moving shown as the host $27_2$ to start the $T_2$ timer and further stops transferring the frame to the other segment C when the $T_2$ timer becomes up.

This embodiment indicates the case where the host 27 locates at the boundary between two radio segments. When the host 27 locates halfway among more than 2 segments, the frame is transferred to the respective segments. When the host has moved to the center of one of those segments, the frame is transferred to one segment upon expiration of the $T_2$ timer, thus preventing the traffic from increasing.

Next the second embodiment of the present invention is described.

Figure 5:
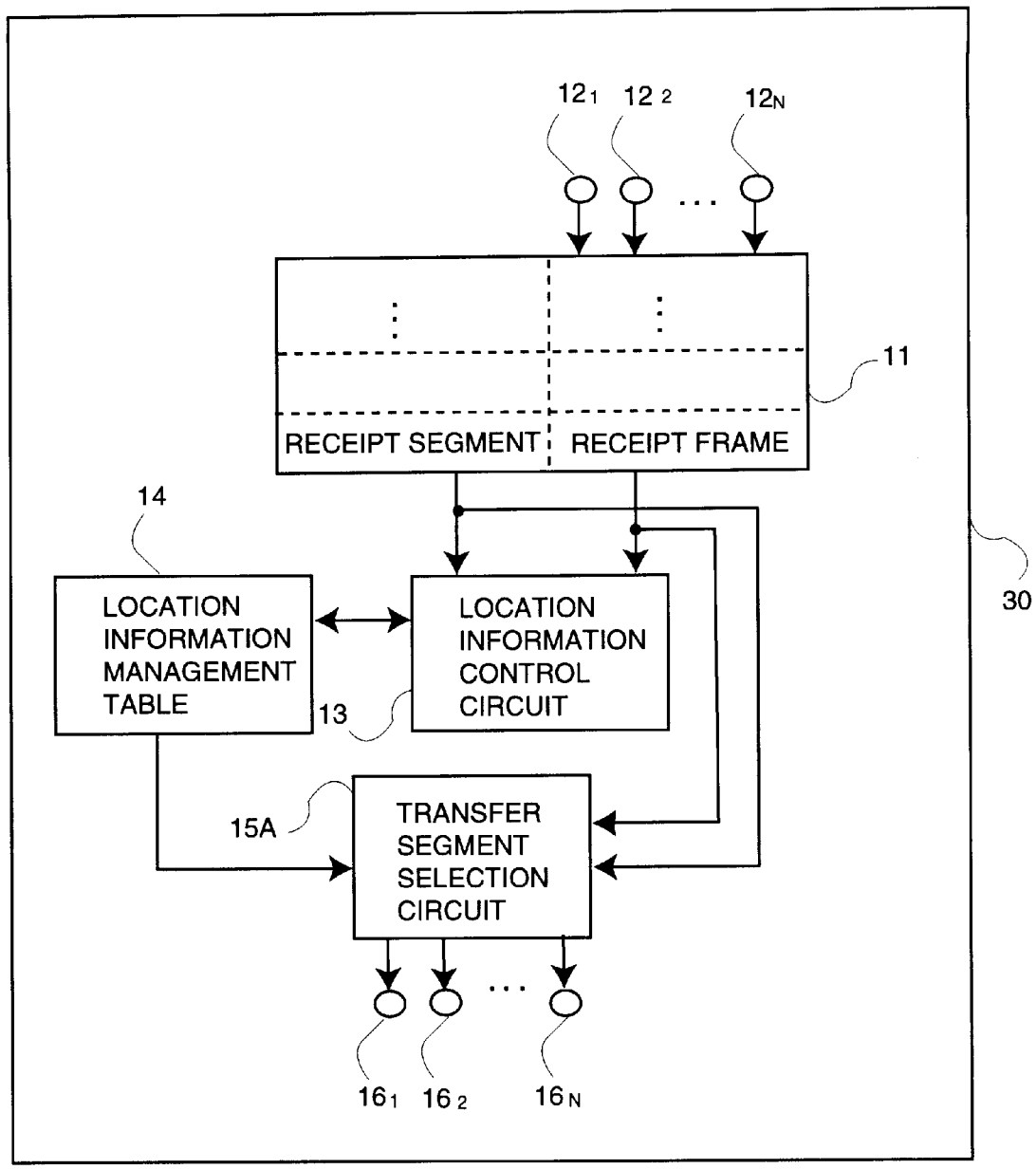
FIGS. 5 is a block diagram showing a construction of a bridge unit when the segment is formed of a broadcast medium such as Ethernet.

FIG. 5 shows a construction of the bridge unit 30 in which the segment is formed of the broadcast medium such as Ethernet. As the elements identical to those shown in FIG. 1 have the same reference numerals, explanation of those elements is omitted. The bridge unit 10 of FIG. 1 inputs only a received frame from the reception memory 11 to the transfer segment selection circuit 15. While a bridge unit 30 of FIG. 5 inputs not only the received frame but also reception segment to the transfer segment selection circuit 15A.

With the segment formed of the broadcast medium, when the segment that has received the frame coincides with the segment connecting the host to which the frame is designated, the bridge unit 30 does not have to transfer the frame. Then unnecessary frame transfer is prevented by inputting both the received frame and the reception segment to the transfer segment selection circuit 15A.

As aforementioned, in the present invention, the frame reception means receives the frame and the host connection segment judgment means judges whether or not the host is connected to the segment other than that has received the frame. Then if the host is judged to be connected to the segment other than that has received the frame, it is determined that the host has moved between the segments and the information indicating that the host is connected to other segment is abandoned after being preserved for a predetermined period. When the transfer existence judgment means determines to transfer the received frame, the segment registered for the location information management table as being corresponded to the host is selected. Then the received frame is temporarily transferred to those segments that are expected to have the host therein so as to have stable communication even though the host locates halfway between the segments. As the information indicating that the host is connected to other segment is preserved for a predetermined time, the received frame does not have to be transferred to a plurality of segments upon expiration of the predetermined time, thus adaptively controlling deletion of the unnecessary traffic.

The historical relationship between the host and the segment is registered for the location information management table. The received frame is transmitted to the registered segments parallely so as to have stable communication even though the host locates halfway between the segments. Furthermore, the past segment is deleted from the location information management table under a predetermined condition. After the deletion, the received frame is no longer transferred to the past segment. Therefore the unnecessary traffic can be adaptively restricted.

The entire disclosure of Japanese Patent Application No. 8-027713 filed on Feb. 15, 1996 including specification, claims, drawing and summary are incorporated herein by reference in its entirety.

What is claimed is:

1. A bridge unit for a network comprising a plurality of segments connected to a plurality of hosts, a subset of said plurality of hosts being mobile hosts capable of moving between said plurality of segments, said unit comprising:

frame reception means for receiving a frame transmitted from one of said plurality of hosts;

a location information management table for managing information regarding connections between said plurality of hosts and said plurality of segments;

host connection segment judgement means for judging whether or not a host having a source address contained in a frame received by said frame reception means is connected to a segment other than a segment that said frame has been received from by referring to said location information management table;

host movement judgement means for determining that said host has moved between segments when said host connection segment judgement means judges that said host is connected to a segment other than a segment that said frame has been received from;

host register means for registering information indication that said host is connected to a segment other than a segment that said frame has been received from said registering being done in the location information management table for a predetermined period and then abandoning said registration information, and also registering information that said host is connected to said segment that said frame has been received from when said host movement judgement means determines that said host has moved between segments; and frame transfer means for detecting a host from said location management table based on a destination address of a received frame and for transferring said received frame to a segment that has been registered as connecting said detected host having said destination address.

2. The bridge unit of claim 1 comprising means for judging whether a received frame is abandoned or transferred based on location information defined by a destination address of said received frame and a segment to which said received frame has been transmitted.

3. A bridge unit for a network comprising a plurality of segments connected to a plurality of hosts, a subset of said plurality of hosts being mobile hosts capable of moving between said plurality of segments, said unit comprising:

frame reception means for receiving a frame transmitted from a connected segment;

a first timer for counting first time $T_1$;

a second timer for counting second time $T_2$;

a location information management table where a host and a segment connecting said host are correspondingly registered;

host judgment means for identifying a host that has transmitted a frame based on a source address contained in said frame received by said frame reception means;

host register judgment means for judging whether a host identified by said host judgment means is registered corresponding to a segment;

host register means for registering said host corresponding to a segment that said received frame has been received from when said host register judgment means judges that said host is not registered corresponding to any segment;

means for operating said first timer corresponding to a segment that said received frame has been received from when said host register means registers said host;

segment coincidence judgment means for judging whether one of segments registered corresponding to said host having said first timer operating coincides with a segment that received frame has been received from when said host register judgment means judges that said host has been already registered;

first timer reset means for resetting said first counter corresponding to said segment detected as coinciding with said segment coincidence judgment means;

means for operating a first counter corresponding to a segment that said received frame has been received from and stopping a first counter of segment registered in correlation with said host and operating a second counter of said segment when said segment coincidence judgment means detects no coincidence of segments;

segment deletion means for deleting a segment corresponding to a second timer from said location information management table; and frame transfer means for detecting a host having said destination address from said location information management table based on a destination address of a received frame and for transferring a received frame to a segment registered as connecting said detected host.

4. The bridge unit of claim 3 further comprising transfer execution judgment means for determining whether a received frame is abandoned or transferred based on location information identified by a destination address of a received frame and a segment to which said received frame has been transmitted.

5. The bridge unit of claim 3, wherein said first timer comprises a timer counting time equal to or larger than a maximum value expected to cause a host to disconnect communication; and said second timer comprises a timer counting time in order to compensate instability of a segment when a host is moving between segments.

6. The bridge unit of claim 3 further comprising means for deleting all segments that are registered in correlation with a host corresponding to a first timer when said first timer terminates counting.

7. A bridge unit for a network comprising a plurality of segments connected to a plurality of hosts, a subset of said plurality of hosts being mobile hosts capable of moving between said plurality of segments, said unit comprising:

frame reception means for receiving a frame transmitted from a connected segment;

a reception memory for storing a received frame corresponding to a segment that said received frame has been received from every time said frame reception means receives a frame;

a first timer for counting first time $T_1$;

a second timer for counting second time $T_2$;

a location information management table where a host and a segment connecting said host are correspondingly registered;

host judgment means for identifying a host that has received from a frame based on a source address contained in said frame received by said frame reception means;

host register judgment means for judging whether a host identified by said host judgment means is registered corresponding to a segment;

host register means for registering said host corresponding to a segment that said received frame has been received from when said host register judgment means judges that said host is not registered corresponding to any segment;

means for operation said first timer corresponding to a segment that said received frame has been received from when said host register judgment means judges that said host has been already registered;

first timer reset means for resetting said first counter corresponding to said segment detected as being coincided by said segment coincidence judgment means;

means for operating a first counter corresponding to a segment that said received frame has been received from and stopping a first counter of segment registered corresponding to said host and operating a second counter of said segment when said segment coincidence judgment means detects no coincidence of segments;

a first segment deletion means for deleting a segment corresponding to the first timer terminating its operation from said location information management table;

a second segment deletion means for deleting a segment corresponding to a second timer from said location information management table;

transfer execution judgment means for detecting a host having a destination address of a received frame from said location information management table, comparing a segment registered as connecting said host having said destination address with a segment to which said received frame when said segments coincide; and frame transfer means for detecting a host having said destination address from said location information management table based on a destination address of a received frame and transferring a received frame to a segment registered as connecting said detected host.

8. The bridge unit of claim 7 wherein said timer first comprises a timer counting time equal to or larger than a maximum value expected to cause a host to disconnect communication; and said second timer comprises a timer counting time in order to compensate instability of a segment when a host is moving between segments.

9. A frame transfer method in a bridge unit for a network comprising a plurality of segments connected to a plurality of hosts, a subset of said plurality of hosts being mobile hosts capable of moving between said plurality of segments, said unit comprising steps of:

identifying a host that has transmitted a frame based on a source address contained in said received frame;

judging whether said identified host is registered corresponding a segment by referring to a location information management table;

registering said host corresponding to a segment that said received frame has been received from when it is judged that said host is not registered corresponding to any segment;

registering a segment that said received frame has been received from corresponding to said host for said location information management table only for first time $T_1$ when said host is registered;

judging whether a segment registered for said first timer corresponding to said host coincides with a segment that has received said frame when said host is judged to have been already registered;

registering said coincided segment for first time $T_1$ again when coincidence is detected;

registering a segment that said received frame has been received from corresponding to said host for first time $T_1$ and registering a segment as being registered corresponding to said host only for a second time $T_2$ different from said first time $T_1$ when coincidence is not detected;

detecting a host having a destination address from said location information management table base on a destination address of a received frame; and transferring said received frame to a segment registered as connecting said detected host by referring said location information management table.

10. The frame transfer method of claim 9, wherein said first time $T_1$ is equal to or larger than a maximum value expected to cause a host to disconnect communication; and said second time $T_2$ is time for compensating instability of a segment when a host is moving between segments.

11. The frame transfer method of claim 9 further comprising a step of detecting a host having a destination address of a received frame from said location information management table, comparing a segment registered as connecting said host having said destination address with a segment to which said received frame has been transmitted and abandoning said received frame when said segments are coincided.

12. A computer program product having a computer readable medium having a computer program logic thereon for transferring a frame in a bridge unit for a network comprising a plurality of segments attached to a plurality of hosts, a subset of said plurality of hosts being mobile hosts capable of moving between said plurality of segments, said unit comprising steps of:

generating a location information management table for registering a host corresponding to a segment connecting said host in storage means;

identifying a host that has transmitted said frame based on a source address contained in a received frame;

judging whether said identified host is registered corresponding to a segment by referring said location information management table;

registering said host corresponding to a segment that said received frame has been received from when said host is not registered corresponding to any segment; registering a segment that said received frame has been received from for said location information management table corresponding to said host only for first time $T_1$ when said host is registered;

judging whether a segment registered for said first time $T_1$ corresponding to said host coincides with said segment that has received said frame;

registering said coincided segment again for first time $T_1$ when coincidence is detected;

registering said segment that said received frame has been received from for said location information management table only for first time $T_1$ and registering a segment registered corresponding to said host for a second time $T_2$ different from said first time $T_1$ when coincidence is not detected; and detecting a host having a destination address from said location information management table based on a destination address of a transmitted frame; and transferring said received frame to a segment registered as connecting said detected host by referring to said location information management table.

13. The computer program of claim 12, wherein said first time $T_1$ is equal to or larger than a maximum value expected to cause a host to disconnect communication; and said second time $T_2$ is time for compensating instability of a segment when a host is moving between segments.

14. The computer program of claim 12 further comprising a step of detecting a host having a destination address of a received frame, comparing a segment registered as connecting a host having said destination address with a segment to which said received frame has been transferred and abandoning said received frame when said segments are coincided.

* * * * *